FLUIDIC DEVICE USING PILLS OF DIFFERENT SIZES

Original Filed Oct. 22, 1965 5 Sheets-Sheet 1

INVENTOR
PETER A. FREEMAN

FLUIDIC DEVICE USING PILLS OF DIFFERENT SIZES

Original Filed Oct. 22, 1965 5 Sheets-Sheet 5

United States Patent Office 3,466,002

Patented Sept. 9, 1969

3,466,002

FLUIDIC DEVICE USING PILLS OF DIFFERENT SIZES

Peter A. Freeman, Baltimore, Md., assignor to Martin-Marietta Corporation, New York, N.Y., a corporation of Maryland Original application Oct. 22, 1965, Ser. No. 501,157, now Patent No. 3,362,633, dated Jan. 9, 1968. Divided and this application Aug. 24, 1967, Ser. No. 670,491

Int. Cl. F16k *31/12, 3/02, 31/08*

U.S. Cl. 251—28 3 Claims

This is a divisional application of Ser. No. 501,157, filed Oct. 22, 1965, now U.S. Patent No. 3,362,633.

This invention relates to fluidic devices and systems using such devices, and more particularly to fluidic devices which employ a pill-like control member which is fluid movable to a plurality of operative positions.

Pure fluid devices and fluid devices having moving parts generally employ a power stream of fluid which may be selectively switched into different output channels by other control fluid streams which intersect at some angle to the stream being switched. Since the output signal is of a higher energy level than the input signal, the devices have been referred to in the art as: "fluid amplifiers." Such devices are relatively rugged and reliable, and occupy minimum space. Further, highly intricate fluid systems involving many basic devices may be constructed in a laminate arrangement at relatively low expense by stamping or otherwise forming the layers or laminates from very thin sheet material, such as plastic or metal.

Pure fluid devices are characterized by the absence of moving parts. While they are not susceptible to inertial forces, the known devices have relatively high system output impedance. Further, pure fluid devices often do not exhibit the necessary stability required in fluid computer apparatus.

In an effort to reduce system impedance and provide more stable operation, pure fluid logic devices have been modified to include moving elements, such as globules of high density liquid metal, relatively massive sliding members, rotating valves or ball valves. These modified fluid devices are highly subject to inertial forces due to the mass of the moving element. Further, close tolerance is needed between the laminates forming the stacked array and the balls or like movable valve members.

It is, therefore, a primary object of this invention to provide an improved fluidic device which affords a high degree of fluid isolation, which requires a very small pressure differential to change the position of the moving member, and in which the device exhibits high inertial restraint.

It is a further object of this invention to provide an improved fluid amplifier which has very large flow gain with slight attenuation in pressure gain.

It is a further object of this invention to provide an improved fluid amplifier which requires very little flow from a driving Coanda element, thus permitting a large "fan-out."

It is a further object of this invention to provide an improved fluidic device of this type which readily incorporates nondestructive memory means.

It is a further object of this invention to provide an improved fluidic device of this type in which the movable member may be moved as a result of electrical impulse, or alternatively, as a result of fluid movement, the movable member indicates the extent of such movement electrically.

It is a further object of this invention to provide an improved binary counter element which ensures high stability in each flow state.

The foregoing and other objects, features and advantages of the invention will be apparent from the following more particular description of preferred embodiments of the invention, as illustrated in the accompanying drawings.

Figure 1A:
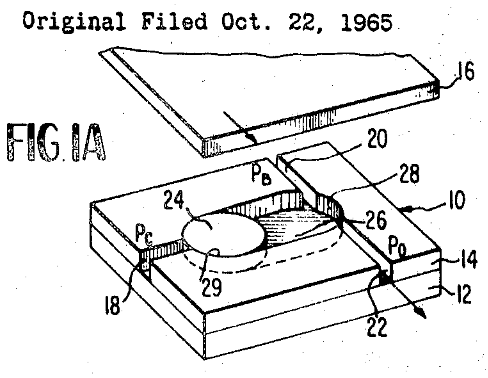
FIGURE 1A is an exploded perspective view of the improved fluidic device of the present invention in the form of an inverter-buffer.

Referring to the drawings, all of the elements, devices, amplifiers, counters and the like incorporate or comprise a fluidic device including an enlarged fluid slot therewithin, which carries a member, movable between extreme fluid positions, to variably couple multiple fluid ports.

The present invention is characterized by the presence of a low mass "pill," either in solid disc form, or as a hollow cylinder, which moves as a result of a small fluid pressure differential from one extreme position to the other; and, as a result, offers considerable reduction in flow requirements and element-to-element impedance matching problems as compared to conventional pure fluid devices involving the Coanda principle.

Figure 2A:
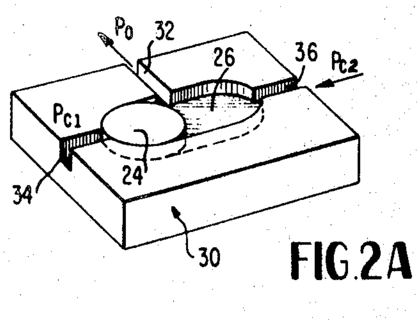
FIGURE 2A is a perspective view of the improved fluidic device of the present invention acting as a selective unidirectional element.
Figure 16:
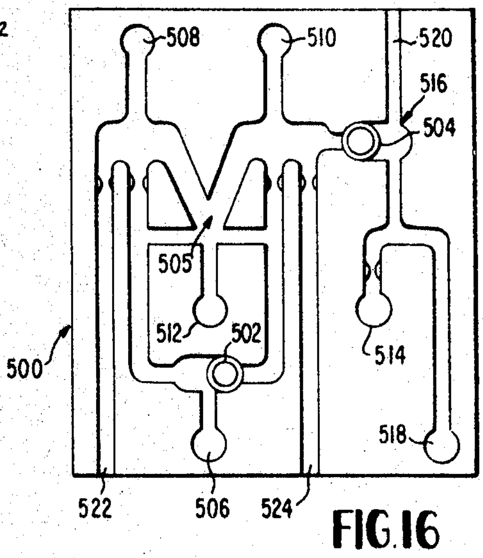
FIGURE 16 is a plan view of a binary counter incorporating a hollow pill as a flow control element under the principles of the present invention.

A typical pill element is shown in FIGURES 1A and 2A. This particular configuration serves as an inverter-buffer or inverter-flow amplifier. As in typical fluid device construction, the device is formed principally by stacking a series of laminates or layers, such as base 12, intermediate section 14 and the cover 16 to form a completely sealed fluidic device except for the port areas. The laminae may be formed from sheets of plastic, metal or the like which may be mechanically milled, chemically treated or etched as desired to form the desired fluid logic path. In this respect, the intermediate layer 14 is provided with port 18 to which is directed the control pressure $P_C$. A low impedance fluidic source, at bias pressure $P_B$, is applied to port 20. When the control pressure $P_C$ is reduced at 18 below $P_B$ at 20, the pill 24 moves to the left end of the slot allowing free passage of flow to the output port 22. Pill 24 which, in this case, is a solid disc of lightweight material, such as plastic, fits within an enlarged, elongated slot 26 having rounded ends 28 and 29 respectively. Thus, in FIGURE 1A, $P_O$ at outlet port 22 equals $P_B$ at inlet port 20. The diameter of pill 24 is slightly less than the width of the elongated slot 26 and at the same time there is no appreciable gap between the faces of the disc 24 and the contact surfaces of either base 12 or cover 14. Thus, the close fit of the pill in the slot allows very little flow past the pill into the control port, thus affording a high degree of isolation. When $P_C$ at port 18 is raised above $P_B$ at port 20, the pill moves to the right end of the slot, within recess 28, shutting off the flow and the output pressure $P_O$ drops to very nearly the system vent pressure. Note that the pill provides the same isolation of $P_C$ from both the bias $P_B$ and the system vent. This characteristic allows a large "fan-out" wherein a large number of pill elements may be driven from a Coanda element with very little flow; hence, very little of the characteristic loss of gain that normally results when a Coanda element drives a significant flow load. While pill 24 is shown in this embodiment, as well as all other applications except FIGURE 16, as being a solid disc, reduction in mass is readily available by using a hollow disc. At the same time, the pressure difference needed to move the disc from one extreme position to the other extreme position is materially reduced. Further, by using a hollow disc or pill, the device is even less susceptible to inertial forces. As a result, any fluid device which utilizes the pill-type fluidic element could be used in high speed aircraft or missile applications with maximum reliability and system stability.

The partially exploded, perspective view of FIGURE 1A discloses the sandwich concept or multiple lamina stack to achieve the desired, sealed, fluid logic device. The remaining figures either show in perspective, plan or schematic views other arrangements utilizing the basic pill technique of the present invention without specifically disclosing the lamina type of structure which is common to fluid devices of this type. For instance, FIGURE 1B which shows the pill 24 in the extreme right-hand position as the result of $P_C$ being greater than $P_B$, is shown with the cover 16 eliminated. With the pill so arranged, the pill 24 blocks any direct flow (except the very small leakage) from the input port 20 to the output port 22 where $P_C$ is greater than $P_B$, or flow from the bias port back through the input port when $P_C$ is less than $P_B$. The pill 24, being very light, requires only a very small pressure differential to move it within slot 26. Hence, an input pressure $P_C$ significantly greater than the bias pressure $P_B$ results in a near zero pressure output $P_O$ (signal inversion). Conversely, an input pressure significantly less than $P_B$ results in $P_O$ being equal to $P_B$, FIGURE 1A.

Element 10 thus provides inversion with an output pressure gain of greater than 1 but with considerable flow gain (since the flow required into the inlet port is only a small leakage past the pill), and considerable power gain. This characteristic is particularly useful in intergrating the logic element into computer circuits, since it does not load down the previous logic stage, yet provides a significant power output to drive a number of parallel succeeding logic stages (fan-out). This element, therefore, forms a basic building block for some of the elements following.

Figure 1B:
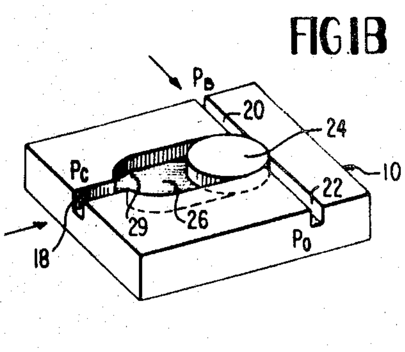
FIGURE 1B is a perspective view of the fluidic device shown in FIGURE 1A with the pill moved to the other extreme position.
Figure 22:
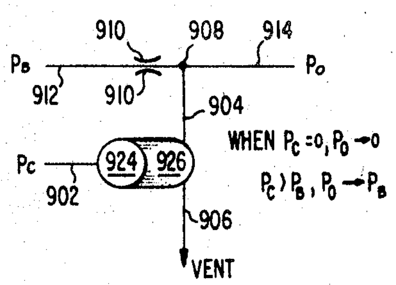
FIGURE 22 is a schematic view of a pulse flow amplifier forming another embodiment of the present invention.

Reference to FIGURE 22 shows a pulse flow amplifier which is, in reality, the inverter-flow amplifier or inverter-buffer of FIGURES 1A and 1B with a fluid restriction in the biasing pressure line. The schematic teaching employs an elongated slot 926 receiving a solid or hollow pill 924. The slot is fluid sealed with the exception of control port 902 at control pressure level $P_C$, and at the opposite end aligned, opposed ports 904 and 906. Flow between ports 904 and 906 is blocked when pill 924 is in the extreme right-hand position. Port 906 acts as a vent port while port 904 is fluid coupled at 908 to biasing pressure line 912. A fluid restriction 910 is provided between the coupling point 908 and a source of biasing pressure $P_B$. The biasing pressure $P_B$ passes through connection 908 to outlet port 914 at pressure level $P_O$. In operation, when the control pressure $P_C$ is equal to 0, the output pressure $P_O$ at port 914 approaches 0 due to venting of the biasing fluid line 912 by the short circuit through port 904 and vent port 906. Likewise, when control pressure $P_C$ is greater than biasing pressure $P_B$, pill 924 is moved to flow blocking position insofar as vent port 906 is concerned. Therefore, the output pressure $P_O$ at port 914 approaches the biasing pressure $P_B$.

Figure 2B:
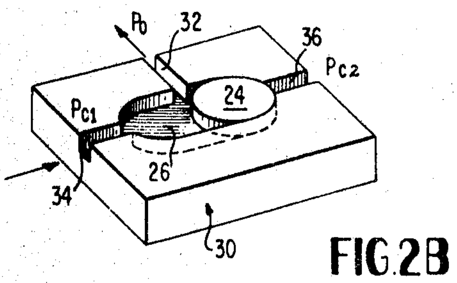
FIGURE 2B is a perspective view of the device shown in FIGURE 2A with the pill in the opposite extreme position.

FIGURES 2A and 2B show a selective unidirectional element 30 which includes the same general arrangement of elements; that is, three fluid ports and a single elongated slot containing the slidable pill 24 movable within pill slot 26. The output pressure $P_O$ at center port 32 is always the same as the highest input pressure either $P_{C1}$ at port 34 or $P_{C2}$ at the oppositely oriented port 36. The higher input pressure, such as $P_{C2}$ in FIGURE 2A, is prevented from feeding back into the lower input pressure port, such as port 34. Alternatively, in FIGURE 2B, output pressure $P_O$ is equal to input pressure $P_{C1}$ with pill 24 moved to the right end of slot 26 blocking fluid connection to input port 36 which is at a lower pressure $P_{C2}$. The selective unidirectional element 30 is very useful for adapting two alternate signals to a single input so that neither interferes with the other. Likewise, element 30 forms a basic building block for the elements and systems to follow.

Figure 3:
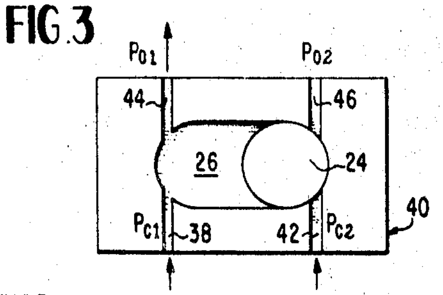
FIGURE 3 is a plan view of an improved double input, pressure selective output fluidic device of the present invention.

FIGURE 3 discloses a double input, pressure selective output device 40 which again employs the single slot 26, the solid pill 24, and the rounded slot ends 28 and 29 which ensure flow blockage when the pill is in contact position. The element 40 includes spaced fluid input ports 38 and 42 and aligned output ports 44 and 46 respectively. In the position shown in FIGURE 3, pressure $P_{C1}$ at port 38 is greater than the pressure $P_{C2}$ at inlet port 42, and the pill is moved to the extreme right, causing $P_{O1}$, to be at pressure $P_{C1}$ and output pressure $P_{O2}$ at port 46 to be approximately 0 with slight fluid leakage. Obviously, if pressure $P_{C2}$ at inlet port 42 becomes greater than the inlet pressure $P_{C1}$ at port 38, the pill 24 will move from right to left allowing fluid communication between ports 42 and 46, and the output pressure $P_{O2}$ at port 46 will be approximately the same as inlet pressure $P_{C2}$ at port 42. Outlet pressure $P_{O1}$ at outlet port 44 then drops to 0 as a result of the blocking of pill 24 as it is received by the recess or curved section 29 at the left end of slot 26.

The small arrows at the entrance, exit and vent ports throughout the specification in relation to all figures indicate the flow direction for the fluid depending upon the conditions within the respective element or device. Where no arrow is shown at a port, no flow is occurring in either direction.

Figure 4A:
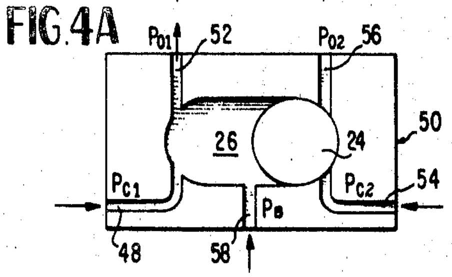
FIGURE 4A is a plan view of an improved bistable element using the movable pill of the present invention.
Figure 4B:
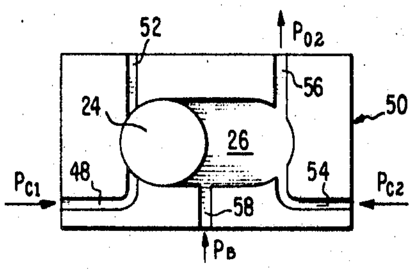
FIGURE 4B is a plan view of the device shown in FIGURE 4A with the pill in opposite fluid position.

FIGURES 4A and 4B show a basic fluid bistable element 50 employing the pill-type fluid control device. The pill slot 26 in this case has five ports, two at each end, 48, 52, 54 and 56 respectively and one in the center at 58. A bias pressure $P_B$ is fed to center port 58. As shown in FIGURE 4A, the output pressure $P_{O1}$ at port 52 is equal to $P_B$. The output pressure $P_{O2}$ at port 56 is at a near 0 as the pill 24 is retained at the right end of the slot, since $P_B$ at port 58 is greater than quiescent levels of $P_{C1}$ and $P_{C2}$ at ports 48 and 54 respectively. To reverse the element, $P_{C2}$ is increased significantly above $P_B$ which moves the pill 24 to the left end of slot 26. The pill will remain there when $P_{C2}$ is reduced to its quiescent level, and $P_{O2}$ at port 56 will be equal to $P_B$, while $P_{O1}$ at port 52 will be near 0 as shown in FIGURE 4B. The element may then be restored to its original state by increasing $P_{C1}$ above $P_B$, thus moving the pill to the right. Optional unidirectional elements may be added ahead of the control ports to prevent the output pressures from feeding back into the control lines when the control pulses are not being sent into the element. The element as thus modified offers higher stability in each flow state to variations at output loading than the typical Coanda type element, although it requires relatively higher control pressures to change it from one state to the other.

Figure 5A:
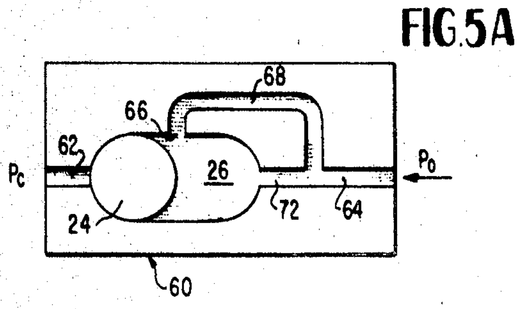
FIGURE 5A is a plan view of an improved diode of the present invention employing the movable pill with the pill in flow preventive position.
Figure 5B:
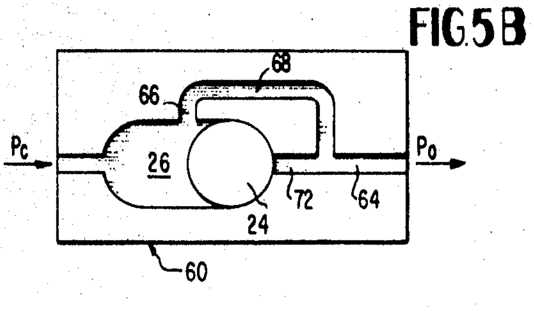
FIGURE 5B is a plan view of the device shown in FIGURE 5A with the pill in flow position.

FIGURES 5A and 5B show another pill-type fluidic element which becomes a basic building block in the fluid computer art. The device 60 comprises a unidirectional element which performs a diode function in any fluid logic system. Again, the basic device includes a pill receiving slot 26, the pill 24 with single ports 62 and 64 at either end. The third port 66 which like the devices in FIGURES 1 and 2 is at the center of the elongated slot 26 is externally connected to one end port, such as port 64. When flow is applied from left to right, the pill 24 moves to a position shown to the right end of the slot allowing passage of the fluid through conduit 68 from port 66 to port 64 through the by-pass port 68. However, when flow is applied from right to left, the pill 24 moves back past the center port and blocks flow through either the by-pass 68 or through the pill slot 26 as in FIGURE 5A. The by-pass path 68 should either be slightly longer, or have slightly greater flow resistance than the direct path 72 from the junction to the end port 64 to be sure that the pill will move to the block flow position when the applied flow is from right to left.

Figures 6, 7, 8A, 8B, 9A, 9B, 11:
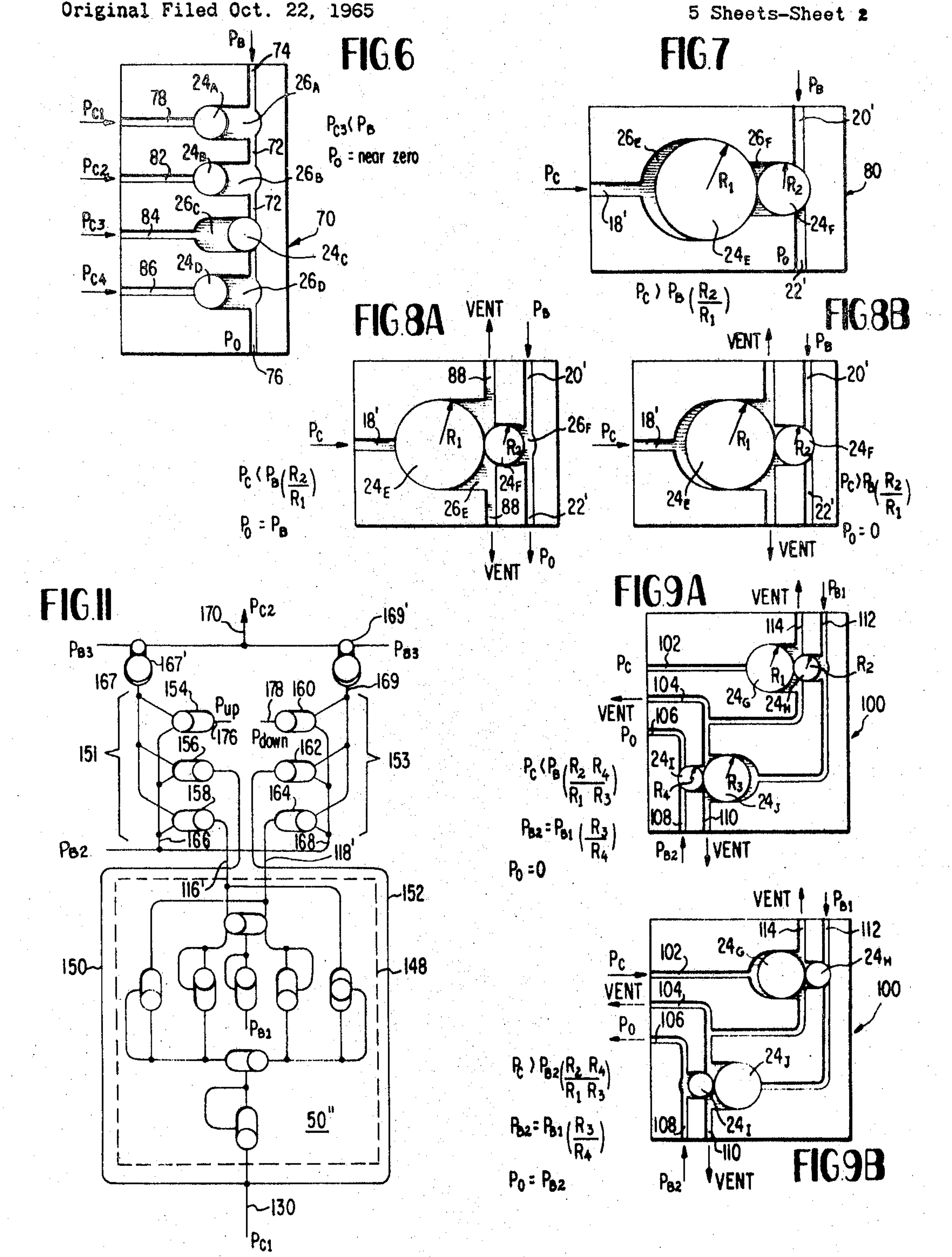
FIGURE 6 is a plan view of a multiple "NOR" element using the principles of the present invention, with the elements arranged in series.
FIGURE 7 is a plan view of an amplifier inverter with pressure and flow gain using the principles of the present invention.
FIGURE 8A is a plan view of a high gain inverter-buffer using the principles of the present invention.
FIGURE 8B is a plan view of the device shown in FIGURE 8A with the different size pills in the extreme right-hand position.
FIGURE 9A is a plan view of a pulse amplifier utilizing the principles of the present invention with the pills arranged in a first position.
FIGURE 9B is a plan view of the device shown in FIGURE 9A with the pills moved to a new extreme position as a result of pulse input.
FIGURE 11 is a schematic view of an "up and down" binary counter stage utilizing completely pill-type fluidic devices of the present inventtion.

The negative alternate (NOR) element shown in FIGURE 6 comprises two or more inverter-buffer elements, such as those shown in FIGURES 1A and 1B, whose bias and output ports are connected together in head-to-tail fashion. In this respect, the NOR has incorporated therein a plurality of pill receiving slots, such as slots 26A, 26B, 26C and 26D, all of which are series connected by a right angle fluid conduit or connecting path 72. The fluid path 72 forms a pressure-biasing port 74 at one end to which is applied the biasing pressure $P_B$ and an output port 76 at the other end which has output pressure $P_O$. Each inverter-buffer element in the order shown includes a control or input port 78, 82, 84 and 86, respectively, to which is selectively applied input or control pressures $P_{C1}$, $P_{C2}$, $P_{C3}$ and $P_{C4}$. The respective pill elements 24A, 24B, 24C and 24D are positioned at respective ends of their slots depending upon the ratio existing between the input pressures and the biasing pressure. With the biasing pressure $P_B$ applied at the bias port at one end of the chain, the element output comes from the port 76 at the other end of the chain. In operation, the application of any one (or more) input pressures $P_{C1}$ through $P_{C4}$, if they are all less than the bias pressure $P_B$, results in the output pressure $P_O=P_B$. Inversely, if any one of the control pressures $P_{C1}$ through $P_{C4}$ is greater than the biasing pressure $P_B$, then the output pressure $P_O$ is equal to near 0 as indicated in FIGURE 6. In FIGURE 6, $P_3$ is greater than the biasing pressure $P_B$ and $P_O$ equals 0. With respect to this patricular device, a large number of inputs (fan-in) can be accommodated, and because the inputs are not summed or added (as in the usual electronic equivalent), the allowable tolerances to avoid ambiguity, required of the input levels, do not become successively tighter with the increasing number of inputs, as in the case with the usual electronic equivalent circuit.

Figure 6A:
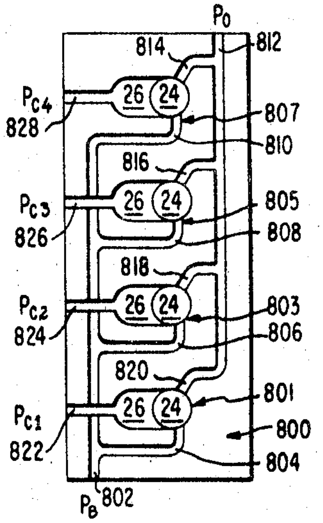
FIGURE 6A is a plan view of a multiple "NAND" (negative coincidence) element, using the principles of the present invention, arranged in parallel.

In FIGURE 6A, a negative coincidence (NAND) element 800 is provided. This fluidic element or device is similar to the NOR element shown in FIGURE 6, except that the output ports are connected to the biasing pressure inlet in parallel rather than in series. Again, multiple inverter-buffer elements 801, 803, 805 and 807 are provided within NAND element 800. Biasing pressure $P_B$ is delivered to the element through inlet port 802 and outlet pressure $P_O$ is provided at outlet port 812. Parallel inlets 804, 806, 808 and 810 are provided, respectively, for sections 801, 803, 805 and 807; and parallel outlets 820, 818, 816 and 814 lead from respective NAND segments 801, 803, 805 and 807 to the common outlet port 812. Each of the NAND segments includes longitudinal pill slots 26 and the pills 24 and individual control pressures $P_{C1}$, $P_{C2}$, $P_{C3}$ and $P_{C4}$ are delivered to respective NAND sections 801, 803, 805 and 807 by control ports 822, 824, 826 and 828, respectively. In operation, $P_O$ at port 812 will remain nearly equal to $P_B$ at port 802 until all of the control pressures $P_{C1}$ through $P_{C4}$ are increased above the biasing pressure $P_B$. When this occurs, all of the pills move from left to right or flow blocking position and this drives the output pressure $P_O$ to near 0. Here again, the tolerances on control pressures are wide compared to the equivalent electronic circuits employing signal-adding techniques.

Reference to FIGURE 7 shows a high gain inverter-buffer 80 which is similar in operating principle to the inverter-buffer 10 shown in FIGURES 1A and 1B. In this case, however two pills of different sizes are used, a relatively large diameter pill 24E and a relatively small diameter pill 24F. Instead of a single longitudinal slot, a large diameter slot 26E receives the large diameter pill 24E and emerges into a small diameter slot 26F. The input of control pressure $P_C$ exists at control ports 18′ and a biasing pressure $P_B$ is delivered to the biasing port 20′. A variable output pressure $P_O$ is presented at the outlet port 22′. The pressure gain (the ratio of input pressure to shut off output pressure) varies with the ratio of pill diameters or radii (assuming both pills are the same thickness). For the condition shown in FIGURE 7, the input pressure $P_C$ is greater than the biasing pressure $P_B$ times the ratio of the radius $R_2$ of the small pill over the radius $R_1$ of the large pill. (If pills of different thickness are used, then $P_B/P_C$=cross-section area of large pill/cross-section of small pill.)

Preferably, a vent to atmosphere is provided between the pills. FIGURES 8A and 8B show a modification to allow such venting. In this embodiment, the vent ports 88 are presented centrally of the device, at the point of mergence between the slots 26E and 26F. The high gain inverter-buffer in this embodiment is shown in FIGURE 8A under conditions in which the control pressure $P_C$ is less than the biasing pressure times the ratio of the small pill radius $R_2$ over the large pill radius $R_1$. Again, the assumption is made that the pills are of equal thickness. In this case, the output pressure $P_O$ at port 22' is equal to the biasing pressure $P_B$. This is contrasted to the conditions of the device as shown in FIGURE 8B which is similar to the position of the element shown in FIGURE 7 in that the control pressure $P_C$ is greater than the biasing pressure $P_B$ times the ratio of the small diameter radius $R_2$ of the small pill 24F over the radius $R_1$ of the large pill 24E. In this case, $P_O$ is equal to near 0.

Two of these elements, in tandem, may form a pulse amplifier with a large flow and power gain and a pressure gain approximately equivalent to the product of the element gains. Such a pulse amplifier 100 is shown in FIGURES 9A and 9B. Note, however, in this case the two levels of bias pressure required. Referring to these figures, it is seen that the pulse amplifier 100 includes an input or control pressure port 102, a common vent port 104, an output pressure port 106, a biasing pressure port 108 at pressure $P_{B2}$, vent ports 110 and 114 and biasing pressure port 112 biasing at pressure $P_{B1}$. Under the conditions shown in FIGURE 9A, the output pressure $P_O$ is 0 when the input or control pressure $P_C$ is less than biasing pressure $P_{B2}$ at port 108 times the pill radii quantity $$\frac{(R_2 \times R_4)}{R_1 \times R_3}$$

and biasing pressure $P_{B2}$ is equal to the biasing pressure $P_{B1}$ at port 112 times the ratio of pill radii $R_3/R_4$ (assuming all pills have the same thickness). Under such conditions, the biasing pressure $P_{B1}$ maintains the pills 24G and 24H to the extreme left position in respective slots and the biasing pressure $P_{B1}$ maintains pills 24I and 24J in their extreme left-hand positions within respective slots to close off the connection between the biasing pressure $P_{B2}$, port 108, and the outlet port 106. The outlet pressure $P_O$ then is approximately 0. However, referring to FIGURE 9B, when the control $P_C$ becomes greater than the biasing pressure $P_{B2}$ times the quantity $$\frac{(R_2 \times R_4)}{R_1 \times R_3}$$

and is equal to biasing pressure $P_{B1}$ times the ratio of pill radii $R_3/R_4$, a shift in pill position occurs in which the pills move from left to right in their respective slots. The outlet pressure $P_O$ at port 106 now becomes equal to the biasing pressure $P_{B2}$ appearing at port 108.

A binary counter element is derived from a modification of the bistable element shown in FIGURES 4A and 4B and may be made by the addition of the several simple building block elements previously described, as shown in FIGURES 10A through 10D inclusive. It should be noted that the counters shown in the drawings and described herein are capable of counting to two, but in actual practice, a plurality of "count to two" counters, otherwise called stages, form counters capable of counting up to any desired value depending upon the number of stages. In like manner to the FIGURES 4A and 4B embodiment, the basic bistable element indicated at 50' includes a sliding pill 24 moving within slot 26, selective output ports 116 and 118, a common biasing port 120 and inlet control ports 122 and 124, respectively. Diode 60' is connected to each control port 122 and 124. Diode 60'''' is connected within bistable biasing port inlet 120. The inlet lines 122 and 124 are coupled selectively to pulse receiving inlet line 130 through a pill-type shuttle valve 30'. Shuttle valve 30' comprises a selective unidirectional element, such as 24, in FIGURE 2A. A diode 60'' is connected in series between the pulse input 130 and shuttle valve 30'. A pair of feedback loops 126 and 128, respectively, are coupled to the control lines 124 and 122. The feedback loops also include diodes 60'''. The feedback loops 126 and 128 are cross-connected to outlet ports 116 and 118 respectively. Of course, each of the fluidic elements forming the simple binary counter include the sliding pills 24 within respective slots 26 and operate in this combination in the exact manner described previously when the devices were treated as separate elements. In this respect, referring to FIGURE 10A, and assuming momentarily that conditions are such that the control pressure $P_C$ at pulse inlet 130 is equal to zero, the pressure $P_{O1}$ at outlet port 116 is equal to the biasing pressure $P_B$ at biasing port 120 of the bistable element 50' (the bias pressure diode 60'''' being in the "flow" position), since its pill 24 is at the extreme right-hand position then output pressure $P_{O2}$ at outlet 118 is near 0, as the pill 24 prevents fluid connection between the biasing pressure and the outlet port 118.

Figure 10A:
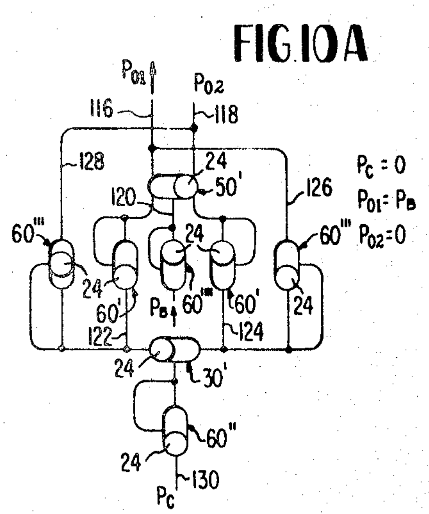
FIGURES 10A, 10B, 10C and 10D are schematic views of a simple binary counter using the improved pill-type fluidic elements of the present invention, with the "pills" in various sequential positions.
Figure 10B:
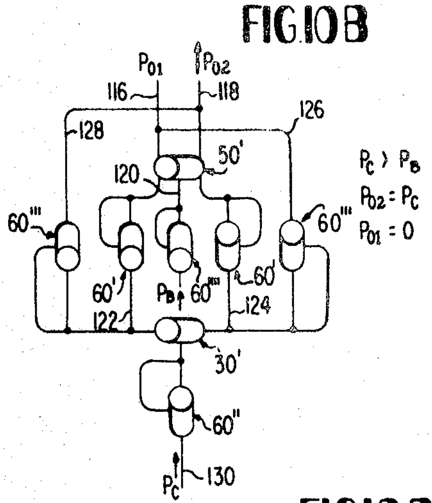

Moving to FIGURE 10B, inlet pressure $P_C$ momentarily, as a result of a pulse input, becomes greater than the biasing pressure $P_B$, which sets the bias pressure diode 60'''' to the no flow position. This also moves pill 24 of diode 60'' from its blocking position to the unblocking position shown to allow the fluid pulse to pass to the shuttle valve 30'. The pill 24 of shuttle valve 30' remains in the extreme left-hand position and the high pressure fluid passes into control line 124 through its respective diode 60' to the bistable element 50'. Since the control pulse $P_C$ is greater than the biasing pressure $P_B$, the pill 24 in the bistable device is moved from its extreme right-hand position to its extreme left-hand position allowing fluid connection between pulse inlet port 130 at pressure level $P_C$ and the outlet port 118 at pressure level $P_{O2}$. The left-hand outlet port 116 has its pressure $P_{O1}$ reduced to 0, since the pill 24 of bistable element 50' is moved to the extreme left-hand position within its slot. In feedback path 128 associated with outlet port 118, the relatively high increase in pressure which is somewhere near $P_C$ has moved the pill 24 of its diode 60''' to unblocking position in which case the feedback pressure is being exerted on the left-hand face of pill 24 within the shuttle valve 30'.

Figures 10C, 12:
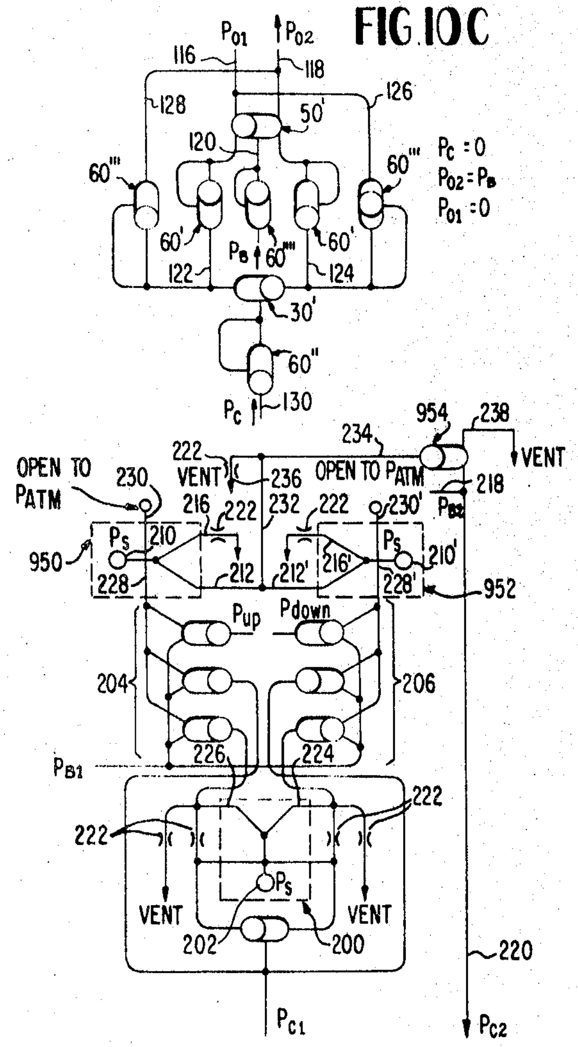
FIGURE 12 is a schematic view of an "up and down" binary counter stage using a combination of the pill-type fluidic devices of the present invention and convention Coanda elements.

FIGURE 10C shows the position of the elements within the binary counter as a result of removal of the inlet or control pulse $P_C$ at port 130. With the control pressure $P_C$ zero at port 130, the pill of diode 60'' moves to flow blocking position. Insofar as the bistable element 50' is concerned, the biasing pressure $P_B$ applied at central port 120 (the bias pressure diode moves again to the flow position) maintains its pill 24 in the extreme left-hand position and the output pressure $P_{O2}$ at outlet port 118 now becomes equal to the biasing pressure $P_B$, while the output pressure $P_{O1}$ at the outlet port 116 remains at 0. The feedback path 128 maintains pill 24 of its respective diode 60''' in the flow blocking position allowing the pressure $P_B$ to be applied to the pill 24 of shuttle valve 30 which moves the pill from the extreme left-hand position to the extreme right-hand position, and also unblocks pill 24 of the diode 60''. The same feedback path further maintains pill 24 of the diode 60' of the bistable inlet 122 in the flow blocking position. Pill 24 of diode 60'' in feedback loop 126 is in the intermediate position since it is subjected to zero pressure on both sides.

Figure 10D:
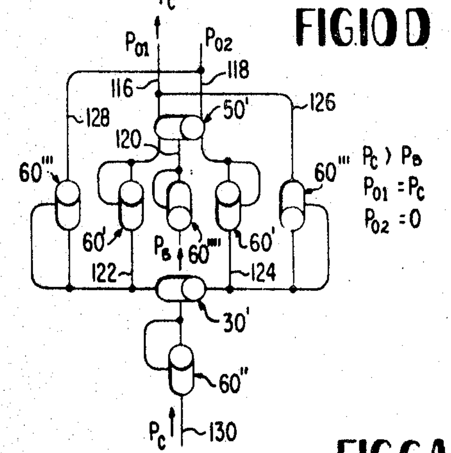

FIGURES 10D shows the position of the elements as a result of the simple binary counter receiving the next pulse count at receiving inlet port 130. $P_C$ again becomes greater than $P_B$ unblocking the diode 60″ and closes the bias pressure diode. This allows the high pressure pulse $P_C$ to travel to shuttle valve 30′. Since the pill 24 of shuttle valve 132 is in the extreme right-hand position, the high pressure fluid $P_C$ passes by way of bistable element input 122 through its diode 60′ to the bistable element itself. This has the effect of moving its pill 24 from the extreme left-hand position to the extreme right-hand position causing the outlet pressure $P_{O1}$ at outlet 116 to move from 0 to $P_C$. Movement of the pill 24 from the extreme left-hand position to the extreme right-hand position of the bistable device causes the outlet pressure $P_{O2}$ in outlet port 118 to drop to 0. With respect to the feedback loops, in feed-back loop 126 which is subjected to pressure $P_C$, the pill 24 of its diode 60‴ moves from the intermediate to flow unblocking position unblocking diode 60′ associated with bistable inlet 124. Further, since the pressure $P_{O2}$ in outlet 118 is dropped to 0, pill 24 of diode 60‴ and feedback loop 128 move into flow blocking position as a result of the high pressure $P_C$ being applied directly to this diode through shuttle valve 30′.

Briefly, in summary, FIGURE 10A shows the initial setting of the element pills in the binary counter prior to application of the first input pulse to the counter. Upon the application of a count pulse $P_C$, the bistable element is reversed as indicated in FIGURE 10B. FIGURE 10C shows the shuttle valve pill reversing upon removal of the count pulse $P_C$, and FIGURE 10B shows the bistable element resetting to its original side upon the second count pulse; when the second count pulse is removed, the shuttle valve resets and the element reverts to the condition shown in FIGURE 10A. A full two pulse count cycle has been completed.

Referring to FIGURE 11, there is shown one arrangement for a reversible counter (up and down). Again, this system uses only pill elements consisting of the simple binary counter 50″ of the type shown in FIGURES 10A through 10D, two three-input (NAND) elements 151 and 153 of the type shown in FIGURE 6A, hereinafter simply referred to as NANDs, and two high gain inverter-buffer elements 167′ and 169′ of the type shown in FIGURE 7. This counter arrangement offers excellent stability, ease of adjustment, output power gain and minimum operating air flow.

Since the operation of the simple counter shown in FIGURES 10A through 10D inclusive has been described in detail and since the operation of the simple counter 148 shown within the dotted line section of FIGURE 11 is indentical, a detailed description of the elements and their specific mode of operation is not included here. Suffice to say that inlet port 130′ periodically receives pulse counts in the same manner as the counter previously described and that the counter 148 will alternately deliver pulses to outlet lines 116′ and 118′, respectively, in response to pulse input. A further modification is made in that a pair of branch inlet lines 150 and 152 deliver pulses simultaneously to segment or component 156 of NAND 151 and component 162 of NAND 153. Further, the outlet pulses from outlet ports 116′ and 118′ pass to components 158 and 164 of NAND's 151 and 153, respectively. As mentioned previously, the device operates as an "up-down" binary counter stage and in this respect, up signal $P_{up}$ passes through line 176 to segment 154 of NAND 151 and the down signal $P_{down}$ is delivered through line 178 to segment 160 of NAND 151. A second control pressure $P_{B2}$ is delivered by means of port 166 to NAND 151 and the same biasing pressure $P_{B2}$ is delivered to port 168 of NAND 153. The output ports 167 and 169 are attached as the input ports to inverters 167′ and 169′ whose output ports are in turn connected together to provide output pulses at $P_{C2}$ for every other input pulse of flow pressure at $P_{C1}$.

Periodic pulse counts are delivered at port 130′ wherein the pressure rises from 0 to $P_{C1}$. This results in changing outlet pressures at ports 116′ and 118′ subject to continuous biasing pressure $P_{B1}$ with the pressures being alternately delivered to NAND segments 151 and 153 in the alternate fashion mentioned previously. Of course, the pressure $P_{B1}$ which is acting upon one side of the NAND segments 158 and 164, respectively, is opposed by the biasing pressure $P_{B2}$ which attempts to pass from inlet ports 166 and 168 to the respective outlet ports 167 and 169 in typical NAND fashion. Since the biasing pressure $P_{B1}$ is greater than the biasing pressure $P_{B2}$, the pill for NAND segment 164 will move to flow blocking position as shown, while the pill associated with NAND segment 158 will move to unblocking position due to the pressure differential.

Further, as a result of pulse count delivery to the inlet port 130′, fluid pulses will travel through conduits 150 and 152 to the NAND segments 156 and 162. Since the pressure at the control or inlet port 130′ rises from 0 to a value equal to biasing pressure $P_{B3}$, which is greater than biasing pressure $P_{B2}$, the pill associated with NAND segment 162 moves from right to left as shown in response to pulse count input at 130′ and simultaneously, the pill associated with NAND segment 156 will move into flow blocking position. The up and down mode is determined by the selective delivery of an up or down fluid signal pressure, $P_{up}$ and $P_{down}$ at inlets 176 and 178 connected to NAND segments 154 and 160, respectively.

Referring to FIGURE 12, there is shown a modified, reversible (up and down) counter stage which combines pill and Coanda type fluidic elements. The arrangement of FIGURE 12 is essentially identical with the arrangement of FIGURE 11 with the exception that the bistable device 148 of FIGURE 11 is replaced by a Coanda bistable element of conventional configuration, as indicated by the dotted line section 200, and a pair of Coanda pulse amplifiers indicated by dotted line sections 950 and 952 between NAND's 204 and 206, respectively, and the pulse counter output for the next stage. In addition, a pulse flow amplifier 954 of the type shown in FIGURE 22 is positioned between the common Coanda pulse amplifier outlet and the counter stage outlet 220. The Coanda bistable element 200 includes a power stream at pressure level $P_S$ emanating from entry port 202. The parallel NAND's 204 and 206 are identical in function to NAND's 151 and 153 of the FIGURE 11 embodiment. The high gain inverter-buffer 80′ forming a portion of the system of FIGURE 11 is replaced by the two Coanda pulse amplifiers indicated by dotted sections 950 and 952 which also receive a power stream at pressure level $P_s$ through ports 210 and 210′, respectively. Each Coanda type pulse amplifier is connected to its respective NAND. For instance, NAND 204 is coupled to Coanda amplifier 950 by means of common NAND outlet 228 which acts as a control port source for the pure fluid Coanda type pulse amplifier 950. With respect to Coanda 950, one outlet line 212 is connected to the flow pulse amplifier 954 which, when activated, removes a flow "short circuit." Thus, this action selectively completes a fluid connection between a second biasing port 218 at pressure level $P_{B2}$ and port 220 delivering the output count pulse $P_{C2}$. Since Coanda elements replace the pill-type fluidic devices, various flow restrictions 222 are provided in the multiple fluid paths. The fluid pulse count outlet pressure $P_{C2}$ varies from 0 to pressure level $P_{B2}$, depending upon the position of the pill within the flow amplifier 954. The second Coanda type pulse amplifier 952 includes identical elements and connections to the Coanda amplifier 950 and identical numerical designations have been provided with the addition of prime marks. Under fluid pressure conditions as shown, the power stream $P_S$ emanating from inlet port 202 passes from Coanda element 200 through line 224 to NAND section 206. The inlet pulse control pressure $P_{C1}$ is 0 as no count pulse is being received. The reversible counter is in the down mode and the biasing pressure $P_{B1}$ passes through the NAND section 204 to common outlet 228 and acts as a control pulse to the Coanda amplifier 950. This control pulse is opposed at control port 230 which is open to the atmosphere at $P_{ATM}$. The power stream $P_S$ emanating from inlet port 210 for the Coanda amplifier 950 passes out through the vent line 216. With no flow in either line 212 or 212' associated with Coanda pulse amplifier 952, the pill associated with the pulse flow amplifier 954 remains in the left-hand position as shown maintaining flow connection between biasing pressure $P_{B2}$ inlet port 218 and vent port 238. The counter output signal $P_{C2}$ at outlet port 220 is therefore near 0. During the next portion of the cycle, the position of the pills within NAND's 204 and 206 drop the pressure at control ports 228 and 228' of the respective Coanda elements to 0 causing the power streams emanating from ports 210 and 210' to flip from outlets 216 and 216' to outlets 212 and 212'. Fluid is then delivered at pressure level $P_S$ through opening 210, line 212, common lines 232 and 234 to the flow amplifier 954 causing the pill to move from left to right to flow blocking position, thus cutting off the flow short circuit through the port 238 and its vent, whereupon the pressure $P_{C2}$ at port 220 rises again to pressure level $P_{B2}$ due to the absence of the direct venting path. Obviously, reversing the mode from "down" to "up" results in blocking port 218 displaced 180° in the cycle from that shown under the conditions indicated in FIGURE 12. In the system shown, port 236, in conjunction with its flow restrictor 222, provides a vent in the pulse amplifier delivery path including lines 232 and 234 to the flow amplifier 954. Upon movement of the respective Coanda pulse amplifier outputs into vent paths 216 and 216', the fluid pressure is relieved in lines 212 and 212' through the vent port 236.

Figure 13:
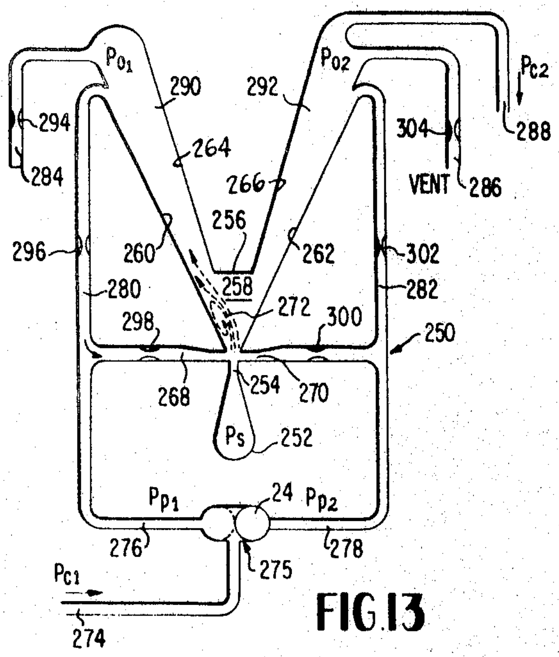
FIGURE 13 is a plan view of a basic (Coanda effect) bistable fluid logic element including a single pill-type fluidic device in an input control function.

The reversible counters in FIGURES 11 and 12 are in schematic form. In order to fully understand the operation of a combined Coanda and pill-type fluidic device, reference to FIGURE 13 shows a plan view of a fluid bistable element 250 which is similar to the element shown in the lower portion of FIGURE 12. The Coanda element is typical of such devices in that it has the standard Coanda configuration involving a teardrop shaped power stream inlet port 252 to which is delivered the power stream at pressure $P_S$ which flows out through the narrow neck 254 towards baffle 256 at the rear of a V-shaped chamber 258. The pure fluid device incorporates on both sides of the V-shaped chamber side walls 260 and 262, respectively, which, along with walls 264 and 266 respectively, provide output legs or paths receiving the power stream depending upon which of the control ports 268 and 270 has last been pulsed. As in conventional Coanda fashion, the power stream indicated by the dotted arrow 272 tends to hug either the left wall 260 or the right wall 262 and maintains flow in this manner even after the control stream pulse ceases in either control port 268 or 270. The device is further characterized by a count pulse inlet at 274, a pill-type selective output element 275, and selective outlets 276 and 278. Fluid paths 276 and 278 are connected to control ports 268 and 270, respectively, at the point of mergence with feedback loops 280 and 282. The Coanda outlet 290 terminates in a vent port 284 while Coanda outlet 292 has coupled to it, a vent port or tube 286, and a second outlet port 288 which delivers the "count" pulse to the next stage. Suitable flow restrictors 294, 296, 298, 300, 302 and 304 are provided in all lines to provide the required flow impedance therein. In the position shown, the initial memory state of the bistable element 250 is such that the main power jet 272 flows into the left leg of the Coanda element at 290. Most of the flow passes through the flow restrictor 294 associated with port 284 and is vented to the atmosphere. A small part of the jet flow becomes a feedback flow through line 280 including its flow restrictor. Thus, $P_{O1}$ in leg 290 is greater than $P_{O2}$ in leg 292, and the pill 24 is retained at the right end of the slot since the pressure $P_{P1}$ is greater on the left-hand side in fluid passage 276 than pressure $P_{P2}$ in right-hand passage 278. Thus, even after the pulse count ceases in line 274, the pill 24 remains in the full line position shown. Note that while the pressure $P_{P1}$ is less than the pressure $P_{O1}$ due to the effect of the induced feedback flow through flow restrictor 296 and into the left control port 268, $P_{P2}$ will remain close to 0 or atmospheric pressure, since pressure $P_{O2}$ remains at nearly 0 pressure relative to the atmosphere and the right control port induces little or no feedback flow. When a count pulse is received from a previous stage or sensor within port 274 as indicated by the arrow, flow passes through the pill valve selective output element 275 directly into the left control port 276 while the pill 24 blocks flow into the right-hand control part 278. The count pulse pressure must be somewhat greater than $P_{P1}$ to change the flow state (flip) of the bistable element 250. When the bistable element flips, the main power jet at 272 moves from the left leg 290 into the right leg 292. Most of the flow passes through flow restrictor 304 and is vented to atmosphere through port 286. A small part of the flow becomes a feedback flow through feedback loop 282 and restrictor 302, while the remainder forms a "count" pulse signal which passes through port 288 to the succeeding counter stage. The pill 24 will remain at the right end of its slot as long as the count pulse is held, since the count pulse pressure is greater than the pressure $P_{P2}$ existing within right-hand control port 276. When the count pulse is released and there is no flow in port 274, (its pressure drops close to atmospheric), then pill 24 will move from the right-hand slot to the left-hand or dotted line position, since the pressure $P_{P2}$ is greater than the pressure $P_{P1}$. Thus, the conditions of the element prior to the arrival of the count pulse are reestablished but in reverse with respect to the sides of the element. The next pulse received by port 274 will flip the main power jet 272 back to the left and upon its release, the pill will be moved to the right side of the slot, as shown in FIGURE 13. Flow restrictors 298 and 300 are optional depending upon the bistable elements control port characteristic; the greater the negative pressure induced on the flow side, the greater the flow restriction required.

Figure 14:
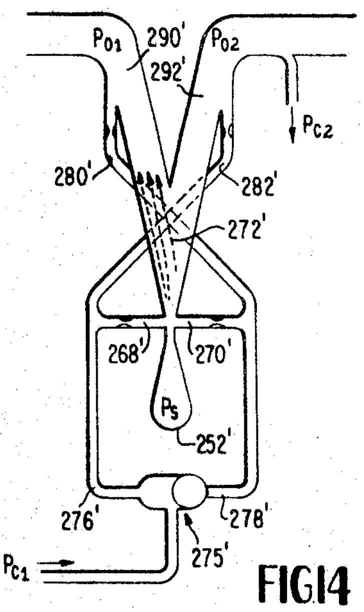
FIGURE 14 is a plan view of a modified fluid amplifier in a modified form employing the pill-type fluidic device of the present invention.

FIGURE 14 shows an alternate pneumatic circuit arrangement, in plan view, in which a negative pressure generated by flow in the output leg using a Venturi tube arrangement moves the pill after the removal of the count pulse. This arrangement is more useful when the device is operated more nearly as a flow amplifier rather than a pressure amplifier. The utilization of the pill valve or selective output element 275' is identical with that in the FIGURE 13 embodiment. The principal difference here is that the left-hand feedback loop 280' instead of being connected to the left-hand control port is connected to the right-hand control port 276', thus providing a negative feedback loop for control port 270'. Likewise, the feedback loop 282' is connected to control port 268' in conjunction with left-hand control port 276'. As shown, the less than atmospheric pressure at $P_{P2}$ causes the pill 24 to move to the right-hand side since it is with pressure $P_{P1}$ which is at atmospheric pressure after arrival of the count pulse $P_{C1}$, and further, due to the feedback connection 282' which is at atmospheric or near atmospheric pressure $P_{O2}$. In the cyclic position shown in FIGURE 14, no count pulse is delivered to the next stage and $P_{C2}$ is 0.

Figure 15:
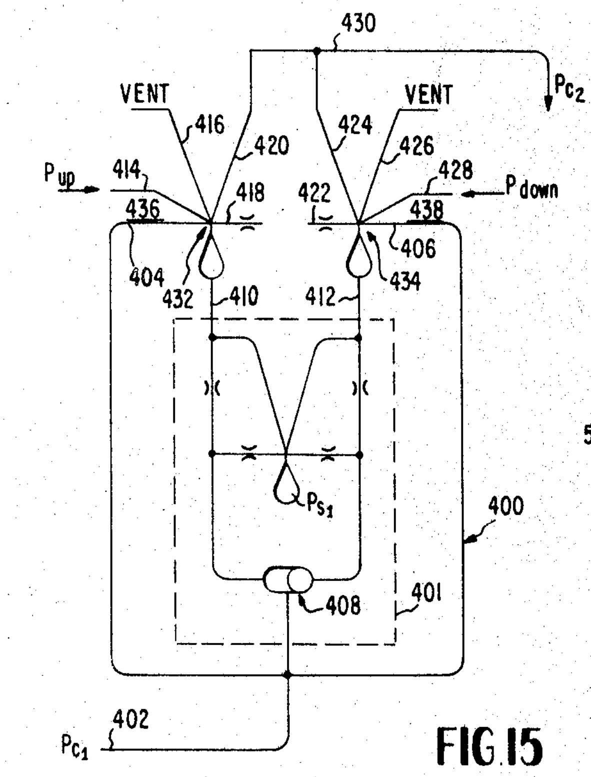
FIGURE 15 is a schematic view of an "up and down" counter using a pill-type fluidic device of the present invention.

Of course, the application of the pill-type fluidic device to counters using Coanda type elements is not limited to the basic counters shown in FIGURES 13 and 14. For instance, FIGURE 15 shows a reversible "up and down" counter 400 which, in fact, incorporates a pill valve binary counter therein. The up and down counter 400 incorporates the binary counter 401 therein which makes use of a unidirectional selective element 408 to selectively deliver the power stream at pressure $P_{C1}$ through outlet ports 410 and 412 to Coanda elements 432 and 434, respectively. The up-down counter includes Coanda type AND sections 436 and 438. AND element 436 requires pill valve flow, such as the power stream through outlet 410, a count-up signal at inlet port 414 and a count pulse from the previous stage $P_{C1}$ through inlet port 404 to flip the power stream. In this respect, the ports 404 and 414 act as control ports for the Coanda element 432 against the vent bias of port 418 to effectively flip the pressure stream passing through Coanda 432 from vent leg 416 to leg 420 providing a count pulse output through common port 430, as indicated at $P_{C2}$.

If the device is operating in the down mode, the pulse $P_{C2}$ is delivered at outlet port 430 only when the P down signal is provided at port 428, a count pulse is received from the control port 406 of the Coanda element 434 and pill valve flow occurs through counter outlet 412; and this acts in opposition to the bias of vent 422 and flips the Coanda power stream from the right-hand vent leg 426 to the left-hand leg 424. In this respect, a count pulse is provided only when the bistable device 401 flips in the proper direction as determined by either a count "down" signal or a count "up" signal.

The pill-type binary counter 500 shown in the plan view of FIGURE 16 is again a slight modification of the basic binary counter but in this case, makes use of hollow pills 502 and 504, respectively, to provide a system which is extremely stable in operation, shows maximum inertial restraint and in which an extremely small pressure differential may move the pills between their extreme operative positions. The mass of the pill is greatly reduced. The pills may be formed by cutting a long, hollow cylindrical member, such as a tube of plastic material into segments of desired thickness. The counter 500 itself includes a pulse input port 506 wherein the supply pressure emanating from port 512 passes into either the right or left-hand leg of the Coanda element 505 for delivery to the "1" output port 508 or the "0" output port 510. The device is equipped with suitable feedback loops to move the pill 502 to alternate right and left extreme positions and also incorporate vents 522 and 524. The inverter-buffer segment 516 acts to selectively prevent passage of fluid from pressure source 514 to vent port 520, thereby delivering the pulse output to the next stage at port 518 when the hollow pill 504 is in the extreme right-hand or flow blocking position. Of course, the flip-flop output pressure of Coanda element 505 must be greater than the pulse output to the next stage or pill 504 would remain in the left-hand position as shown.

The presence of the pills in the fluidic devices of the present invention makes immediately available several techniques for providing long-term or short-term memory, either with or without the application of fluid power during the memory period. The basis of these techniques is to employ a permanent magnetic material (barium ferrite or the like) to form the pills or to form a portion of the pills, such as an insert within the hollow type pill of the type shown in the embodiment of FIGURE 16.

Figure 17A:
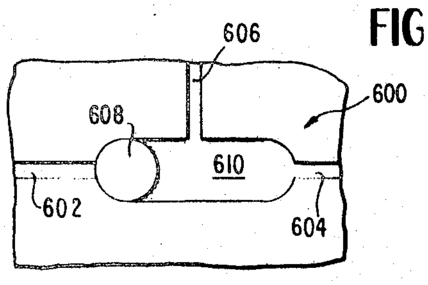
FIGURE 17A is a plan view of an improved fluidic device of the present invention incorporating memory means for positively locating the pill within its fluid slot.
Figure 17B:
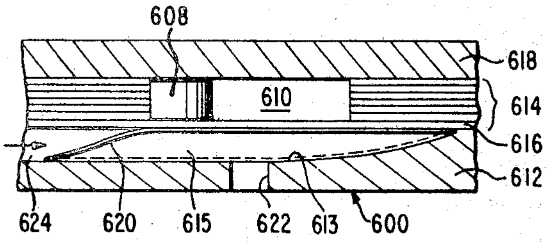
FIGURE 17B is a side elevation of the device shown in FIGURE 17A.
Figure 18:
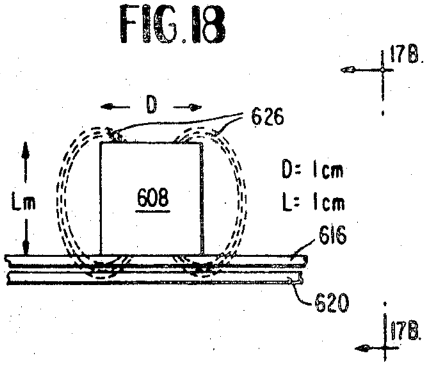
FIGURE 18 is an elevational view, in section, of a portion of the device shown in FIGURE 17B showing the locking effect of the magnetic field on the ferromagnetic spring member.

The first of two different approaches to incorporate magnetic fluid memory to the pill-like elements or devices is shown in FIGURES 17A, 17B and 18. This technique utilizes small diaphragms of ferromagnetic material which are kept remote from the plane of motion of the magnetized pills when the operating pressure is applied to the power channel of the fluidic devices in question, but which are forced close to the pill plane of motion immediately upon removal of such pressure. This allows the magnetized "pill" to induce an opposite pole in the ferromagnetic material opposed to it. The resulting mechanical force thus produced will "clamp" the pill in its then present position. The state of a register or other multistable device may be thus preserved indefinitely, even in very adverse environments, such as those subjected to high acceleration forces, until the reapplication of fluid power. Strong external magnetic fields will not affect the "memory." Indeed, the only kind of physical effect which could produce loss of memory would be the heating of the magnetized pills above the Curie point, which is approximately 860° F. for the material used. Since this is outside the operating range of most foreseeable applications, the magnetized pill-type of memory offers obvious advantages.

One possible construction is shown in FIGURES 17 and 18 for a selective unidirectional element 600 which incorporates a "1" output port at 602 at the left-hand end of slot 610 and a "0" output port 604 at the right-hand end of the slot. Intermediate of the ends of the slot is the memory bias pressure port 606, and of course, the device incorporates a pill 608 which is readily movable between the extreme ends. The device as so far described appears to be identical to the fluidic device shown in FIGURES 2A and 2B and operates in the identical fashion. However, referring to FIGURE 17B, it is noted that the laminated array or assembly includes a base member 612 of some thickness formed of nonmagnetic material which has its inner surface 613 shaped so as to form a cavity 615. A single full lamina 616 extends throughout the element between the base 612 and the laminae sections 614 which form the interior of the sandwich to provide the elongated slot 610 receiving movable pill element 608. A cover plate 618 completes the sandwich. The cavity 615 has positioned therein a small ferromagnetic spring leaf member 620 which rests against the bottom lamina. However, with fluid pressure applied during normal operation of the fluid device, as indicated by arrow 624, to the extreme left of cavity 615, the ferromagnetic spring leaf member is pushed or moved away from the single full lamina 616 against the inner surface 613 of the base member 612, as indicated by the dotted line position. In so moving, the spring leaf is driven against the exit port 622. Port 622 is a vent permitting fluid to flow into and out of cavity 615 under leaf 620, thus permitting operation of the leaf. The magnetized pill 608 is moved from the extreme left-hand position within slot 610, as shown, to the right-hand position when the fluid inlet to port 602 is greater than the fluid pressure at "0" output port 604, whereupon fluid communication is established between ports 606 and 602. When fluid pressure is then removed from the left-hand side of cavity 615, spring leaf 620 returns to the position shown in full line in FIG. 17B, adjacent to the plane of motion of the magnetic pill, thus "clamping" the pill in its new position.

Referring to FIGURE 18, the magnetic field relationship between the magnetic pill 608 and the ferromagnetic spring leaf 620 is shown. Typical dimensions of the magnetic pill 608 are such that the diameter is equal to 0.1 centimeter and the mean length and the width of the pill $L_M$ is equal to 0.1 centimeter and for a pill formed of non-oriented barium ferrite, B=1025 gausses, and H=410 oersteds or alternatively, if a grain oriented material is used, the value for B is 2700 gausses and the value of H is 1030 oersteds. The single full lamina 616 comprises brass .005 inch in thickness and the ferromagnetic spring leaf 620 is formed of relay type silicon steel having small hysteresis and remanence of .005 inch thickness with .002 inch air gap at the time that there is no supply pressure as at 624 with the strip position. As indicated in FIGURE 17B, the following situation is experienced. Virtually the total flux emanating from one end of the pill will travel transversely in the steel strip 620. Assuming the external permanence is only slightly reduced by the presence of the steel (conservative), the flux density in the steel at the critical section, FIGURE 18, is for nonoriented pills, $B_{crit}$=2050 gausses, for oriented pills. $B_{crit}$ =5410 gausses. This is far below saturation. Taking the equivalent pole strength of the induced pole at the surface of the steel as equal to the pole strength of the pill surface, the clamping force is, then, $$F=\frac{B^2A}{1.732}\text{ lbs.}$$

where B is in kilogaussess. For nonoriented pills, $$F=\frac{2.050^2\times(.040)^2}{4\times1.732}=.00306\text{ lbs.}$$

The pill weighs $$\frac{.126\times(.040)}{4}\times.040=.00000634\text{ lbs.}$$

Taking the friction coefficient of the pill on brass (static) as .3, the pill can withstand $$\frac{.00306\times.3}{.00000634}=145\text{ g.}$$

without being displaced. There is hardly any need to use the oriented material, however, it would increase this value to $$145\times\left(\frac{5.4^2}{2.05}\right)\times\frac{.126}{.181}=697\text{ g.}$$

The displacement of the steel pole piece by the appearance of pressure through about 1/16", that is, the gap dimension of cavities 615, will remove virtually all of this force. It may be desirable in some cases to install a fixed pole piece permanently 1/16" from the opposite end to balance the small residual restraint.

Figure 19:
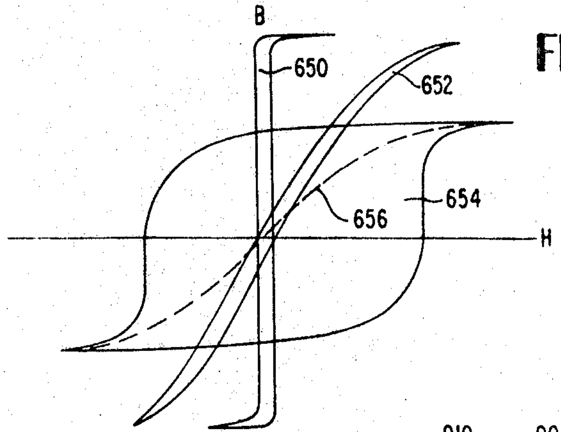
FIGURE 19 is a plot of the hysteresis loops of the materials forming portions of the apparatus shown in FIGURES 17A and 17B.
Figure 20:
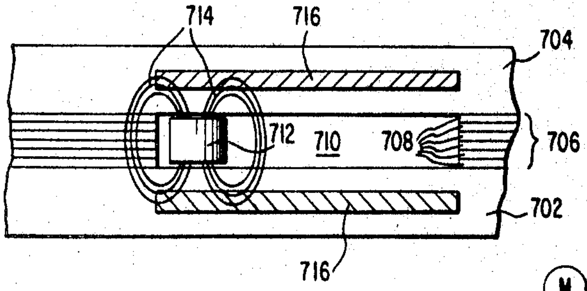
FIGURE 20 is a side elevation of yet another embodiment of the pill-type fluidic element having magnetic memory means.

All ferromagnetic materials exhibit more or less hysteresis. This is the term applied to the phenomenon associated with the work done in changing the flux density or direction in ferromagnetic material from one state to another. The characteristics of various materials are extremely varied in this regard. Reference to FIGURE 19 shows a plot of the hysteresis loops as applied to various materials. For instance, the areas enclosed withinthe hysteresis loops are proportional to the work done in reversing a magnetic state and then returning it to its original state. In transformer or other A.C. applications, it is desirable to keep this area small so as to avoid heating and waste of energy. In permanent magnet materials, a large "fat" loop is desirable, for the material is used to store energy, and works in the second quadrant entirely. Specialty materials, such as Supermendur, develop very large values of flux density at very small applied field strengths, so that, even though the hysteresis loop is rather narrow, appreciable energy is stored in it even with small applied fields. Such materials are quite expensive to produce and must be protected from mechanical strain after the annealing process to preserve these characteristics. However, in providing memory for the pill-type multistable devices, they find excellent application since the mechanical forces available from small induced fields in such materials can provide considerable restraint of motion of the pills, yet be kept small enough that the fluid driving forces can reliably overpower this restraint. The hysteresis loop for transformer steels is shown at 652, the hysteresis loop for typical permanent magnetic material is shown at 654, while the hysteresis loop for the material, such as Supermendur, is shown at 650. The dotted line 656 represents the virgin curve. In using the hysteresis characteristics of the Supermendur material to provide the magnetic memory function, the embodiment shown in FIGURE 20 is similar in some respects to the embodiment shown in FIGURES 17A through 18, except that small sheets of material having a proper hysteresis loop are permanently installed at about .40 inch distance, for instance, from each side of the pill to be controlled with a pill of dimensions shown in FIGURE 18, for instance. Thus, the stacked array would include a base member 702, a cover 704 and an intermediate section 706 formed by a number of relatively thin shim sheets 708 of non-magnetic material (brass, plastic, etc.) which are photoetched, for instance, to form the desired geometry and stacked together to provide the extremely close tolerances desired. The slot 710, in like manner to all previous embodiments, receives the pill 712 formed of permanent magnet material, such as barium ferrite, or of an alloy including barium ferrite, such as in magnetic powder form which is permanently magnetized to provide the magnetic fields 714. Embedded within the base 702 and the cover 704 adjacent the slot 710 are the thin sheets 716 of material having a proper hysteresis loop, such as Supermendur. With the sheets 716 installed at equal distances from the pill, the attractive forces would be very nearly in balance. In order for the pill to move, then it must do work on the sheets to reverse the field in some of the material and change the value of flux in other parts. The force necessary to do this small amount of work must be applied by the driving force on the pill itself. Obviously, a small fluid pressure differential on opposite sides of the pill will move it from the extreme left-hand position to the extreme right-hand position and vice versa. The required fluid force will be greatest when using a permanent magnet material for the embedded sheet 716, but the "stiffness" of the restraint would be greatest using Supermendur. Different requirements obviously would result in the use of different materials. A moderately severe mechanical environment would suggest the use of "Cunife," a copper-nickel-iron alloy which has large hysteresis at low inductance. The requirement for very high cyclic rate or clock rate in a register or other device which would require a memory means, would suggest the use of Supermendur or like material because of the great "stiffness" available with small applied field strength. Typically, at 1500 gauss, Vicalloy has a hysteresis energy of about 1/10 joule per cubic inch of material, at 500 gauss, about .07 joule per cubic inch, ($10^6$ ergs and $2\times10^5$ ergs per cubic inch). In this case, about .00015 in.$^3$ of material would be involved per pill at any instant, so that at the higher flux density noted, 150 dyne-cm. of work is required in moving a pill 1 cm. or 1.5 dyne-cm. to move it 0.1 cm. (a force of 150 dynes). If the pill weighs about .00000634 lbs. or .00288 gram, at 1 g. it exerts a force of $.00299\times980=2.82$ dynes. Under such circumstances, Vicalloy plates about .03" thick would provide memory restraint of up to $150/2.82=53$ g. with no more than .01 cm. displacement. Using Supermendur, good restraint against several g.'s would be feasible with small driving forces at very high rates.

Figure 21:
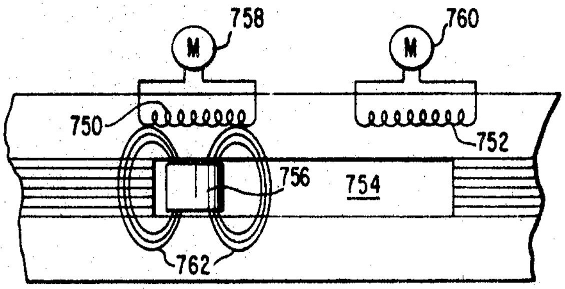
FIGURE 21 is a side elevation, in section, of yet another embodiment of the present invention.

In using a pill which is formed of a permanent magnet material, or of any alloy including permanent material, magnetized in the order of pill 608 and pill 712 of the previous embodiments, the movement of the pill between extreme slot positions may, provide an electrical indication of the position occupied by the pill or its previous direction of movement; or alternatively, electrical means may be used to actually drive the pill to a new position within the slot and thus, vary the fluid path by electric-to-fluidic conversion means. For instance, referring to FIGURE 21, the addition of coils 750 and 752 near the ends of pill slot 754 allows the coils to be used either for positioning the pill 756 electromagnetically, or detecting pill movement for induced voltages as a result of movement of a permanent magnet pill 756 relative to the stationary coils. In the arrangement shown, coil 750 is connected directly to a sensitive meter 758 which coil 752 is connected directly to meter 760. Movement of the pill 756 from its extreme left-hand position as shown to the right-hand position will result in inducing a signal first across meter 758 as the pill moves away from coil 750 and subsequently across meter 760 as the pill moves underneath coil 752. Obviously, with the pill 756 in the position shown, the application of electrical energy through coil 750 from an outside source (not shown) would result in the formation of a magnetic field in opposition to the field 762 existing within the permanent magnet pill 756, which would tend to drive the pill from the extreme left-hand position to the right-hand position of the slot 754. The subsequent application of a like direct current through coil 752 would result in return movement of the pill to the position shown in FIGURE 21. Such movement could be sensed by the coil not acting as a driving means and which has remained connected to the meter or other indicating device. In the most simple form, the pill 756 may comprise a magnetic material which is not permanently magnetized and, therefore, has no field of its own but is merely subjected to a magnetic field emanating as a result of current passing through either coil 750 or coil 752 to thereby move the pill to a position in the center of slot 754. For instance, if the pill 756 were formed of magnetic material and an alternating current source or direct current source were connected across coil 752, the resultant magnetic field would act upon the magnetic pill and tend to move it to a position centrally within slot 754 of minimum magnetic field energy. In this manner, simplified electric-to-fluid conversion is provided. With the straightforward arrangement shown, the fluidic control systems achieve immediate compatibility with a wide variety of electrical sensors useful in space craft control systems. In addition to the induction sensor shown, coupling of fluidic circuits to such typical electrical sensors, as solar cells, IR detectors, RF antennas, etc., is envisioned.

The dimensions of the slot pill, pill materials, port dimentions and configurations are not critical with the exception that the slots are preferably rounded at the point of intersection with transverse fluid conduits or ports to ensure proper sealing when the pill is in the flow blocking position and that further, the diameter of the slot is greater than the width of the coaligned fluid ports so as to ensure proper sealing in an axial direction. It is, of course, preferable to keep the size of the slots and, therefore, the pills relatively small so as to increase inertial restraint and provide maximum stability for the fluidic devices employing the pill type moving element. In addition to a decrease in mass for the hollow pill device, such as that shown in the FIGURE 16 embodiment, reducing the pressure differential required to physically move the pill between extreme fluid positions within the slot, the hollow disc-like pill provides some resilience, whereupon the greater the pressure differential, the greater the sealing effect as the pill is slightly distorted within the slot. This, of course, may be or may not be an advantage depending upon the specific application.

What is claimed is:

1. An improved fluidic pulse amplifier characterized by large flow and power gain and a pressure gain approximately equivalent to the product of the element gain comprising: a first high gain inverter-buffer consisting of first and second, fluid sealed, elongated slots of different diameter, but in axial alignment, means for fluid coupling said first and second slots, the width of said second slot being less than the width of said first slot, a first biasing port connected to the outer end of said second slot, a first outlet port connected to the same end of said second slot but spaced from said biasing port, a control port coupled to said first slot at the end of said slot remote from said second slot, a second high gain inverter-buffer consisting of third and fourth, fluid sealed, fourth slots, said third and fourth elongated slots being elongated slots, means for fluid coupling said third and in axial alignment with the width of said fourth slot being less than the width of said third slot, a second biasing port connected to the outer end of said fourth slot, and a second outlet port connected to the end of said same slot but spaced from said second biasing port, said slots being rounded at the ends in the area of port coupling, means for connecting the outlet port of said first high gain inverter-buffer to the end of said third slot remote from said fourth slot and hollow disc-like pills positioned within respective slots having a diameter in the order of their slot width, whereupon a control pressure which is greater than the biasing pressure of the pill in the second slot times the radius of the pill in the fourth slot over the radius of the pill in the first slot times the radius of the pill in the third slot results in blocking of the first biasing port from the first outlet port and unblocking of the second biasing port from the second outlet port if the biasing pressure of the second biasing port equal to the biasing pressure of the first biasing port times the ratio of the pill in the third slot over the radius of the pill in the fourth slot.

2. An improved fluidic, high gain inverter-buffer comprising:
- a first fluid sealed, elongated slot of substantially rectangular cross-section;
- a second fluid sealed, elongated slot of substantially rectangular cross-section, being substantially smaller in width than said first slot and being axially aligned and in fluid communication with said first slot;
- first and second disc-like pills positioned in said first and second slots respectively, said pills having diameters on the order of their respective slot width;
- a control port connected to said first slot at the end remote from said second slot;
- the end of said second slot remote from said first slot being rounded to accommodate its respective pill when said pill is at the end of its travel in a direction away from said first slot; and
- a biasing port and an outlet port intersecting said second slot in said rounded portion;
- whereupon the presence of fluid at said control port at a pressure greater than the pressure at said biasing port times the ratio of the radius of said second slot pill over the radius of said first slot pill crosses said pills to move so that second slot pill blocks fluid connection between said biasing port and said outlet port.

3. The device as claimed in claim 2 wherein said pills are hollow.

References Cited

UNITED STATES PATENTS

| | | | |
|---|---|---|---|
| 443,532 | 12/1890 | Lund | 137—112 X |
| 2,354,255 | 7/1944 | Gillum et al. | 137—515.5 |
| 3,057,551 | 10/1962 | Etter | 137—625.48 X |
| 3,319,885 | 5/1967 | Eige | 235—201 |

ARNOLD ROSENTHAL, Primary Examiner

U.S. Cl. X.R.

235—201; 251—63.4